US010254945B1

(12) United States Patent
Gupta et al.

(10) Patent No.: US 10,254,945 B1
(45) Date of Patent: *Apr. 9, 2019

(54) CONTEXTUAL STATE-BASED USER INTERFACE FORMAT ADAPTATION

(71) Applicant: Microsoft Technology Licensing, LLC, Redmond, WA (US)

(72) Inventors: Rahul Gupta, Hyderabad (IN); Pradeep Kumar Reddy K, Hyderabad (IN); Bhavesh Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,992

(22) Filed: Jul. 2, 2018

(51) Int. Cl.
*H04L 12/58* (2006.01)
*G06F 3/0484* (2013.01)
(Continued)

(52) U.S. Cl.
CPC ....... *G06F 3/04847* (2013.01); *G06N 99/005* (2013.01); *H04L 51/22* (2013.01); *H04L 67/306* (2013.01)

(58) Field of Classification Search
CPC ............ H04W 36/0072; H04W 4/005; H04W 68/005; H04W 92/02; H04W 28/0289; H04W 36/24; H04W 68/02; H04W 12/06; H04W 76/02; H04W 12/08; H04W 24/02; H04W 72/0486; H04W 88/06; H04W 36/0055; H04W 36/0066; H04W 48/18; H04W 68/00; H04W 84/005; H04W 88/02; H04W 8/16; H04W 84/045; H04W 36/0022; H04W 8/10; H04W 76/021; H04W 4/10; H04W 76/005; H04W 52/0251; H04W 52/0254; H04W 4/001;
(Continued)

(56) References Cited

U.S. PATENT DOCUMENTS 8,914,399 B1 12/2014 Paleja et al.
9,612,847 B2 4/2017 Deutsch et al.
(Continued)

OTHER PUBLICATIONS

"Contextual State-Based User Interface Notification Triggering", U.S. Appl. No. 15/975,471, filed May 9, 2018, 49 Pages.
(Continued)

*Primary Examiner* — Nimesh Patel
(74) *Attorney, Agent, or Firm* — Goff IP Law PLLC; Jared S. Goff

(57) ABSTRACT

A user interface control format of one or more user interface controls of a user interface area can be adapted to fit a current contextual user interface activity state in a computer system. The adapting of the format can produce a user interface adaptation instruction that indicates the adapted format. The adapting of the format can use data representing the current contextual user interface activity state in the computer system. Also, the current contextual user interface activity state can be a state other than a state of a displaying computer application. The user interface adaptation instruction can be used in generating the user interface area with the adapted format indicated in the user interface adaptation instruction. The user interface area can be presented with the adapted format on the computer display for the displaying computer application in the computer system.

20 Claims, 11 Drawing Sheets

(51) Int. Cl.
*G06N 99/00* (2019.01)
*H04L 29/08* (2006.01)

(58) Field of Classification Search
CPC ....... H04W 60/00; H04W 60/04; H04W 8/04; H04W 8/26; H04W 36/00; H04W 72/04; H04W 4/06; H04W 64/003; H04W 72/02; H04W 88/04; H04W 88/182; H04W 8/06; H04W 76/023; H04W 8/005; H04W 4/021; H04W 4/16; H04W 48/08; H04W 4/08; H04W 28/08; H04W 48/16; H04W 4/025; H04W 4/02; H04W 4/04; H04W 4/60; H04W 64/00; H04W 12/02; H04L 47/808; H04L 47/824; H04L 12/66; H04L 47/29; H04L 41/0806; H04L 41/12; H04L 41/5041; H04L 43/00; H04L 43/0811; H04L 63/104; H04L 63/123; H04L 63/162; H04L 12/189; H04L 67/125; H04L 45/70; H04L 49/25; H04L 29/12754; H04L 61/106; H04L 61/3085; H04L 61/605; H04L 65/1006; H04L 65/104; H04L 65/105; H04L 41/50; H04L 47/11; H04L 41/0853; H04L 47/10; H04L 47/14; H04L 63/10; H04L 65/1063; H04L 65/1069; H04L 2012/2841; H04L 47/2475; H04L 5/0035; H04L 61/6054; H04L 67/22; H04L 67/306; H04L 65/4084; H04L 51/04; H04L 65/80; H04L 67/148; H04L 67/30; H04L 29/08693; H04L 47/821; H04L 51/08; H04L 51/20; H04L 51/22; H04L 51/26; H04L 63/0853; H04L 63/1408; H04L 65/40; H04L 65/601; H04L 67/02; H04L 67/16; H04L 51/36; H04L 51/00; H04L 67/303; H04L 51/24; H04L 51/043; H04L 51/12; H04L 51/18; H04L 67/26; H04L 41/145; H04L 51/32; H04L 12/1813; H04L 12/1859; H04L 51/10; H04L 67/325; H04L 67/327; Y02D 70/1242; Y02D 70/146; Y02D 70/1224; Y02D 70/1262; Y02D 70/1222; Y02D 70/126; Y02D 70/1264; Y02D 70/142; Y02D 70/144; Y02D 70/23; Y02D 70/24; Y02D 70/21; H04M 1/72519; H04M 15/7655; H04M 15/8278; H04M 2215/202; H04M 2215/204; H04M 2215/32; H04M 11/00; H04M 3/42365; H04M 15/8033; H04M 1/72569; H04M 1/72572; H04M 2203/2038; H04M 2203/551; H04M 2250/12; H04M 7/0033; H04M 1/72547; H04M 1/72563; H04M 1/72577; H04M 2201/40; H04M 2250/74; H04M 3/4938; H04M 1/72597; G06Q 30/02; G06Q 10/109; G06Q 50/01; G06Q 10/10; G06Q 30/0269; G06Q 10/06311; G06Q 10/107; G06Q 30/0267; G06Q 30/0255; G06Q 30/0261; G06Q 30/0264; G06Q 50/22; G06Q 10/06313; G06Q 30/0209; H04H 60/31; H04H 60/54; H04H 60/70; G10L 15/30; G10L 15/183; G10L 15/22; G10L 2015/0631; G10L 15/26; G10L 17/22; G10L 2015/088; G10L 2015/223; G10L 25/48; G10L 15/16; G10L 15/20; G06F 9/4843; G06F 17/30867; G06F 3/167; G06F 21/74; G06F 9/45533; G06F 9/468; G06F 9/485; G06F 17/30029; G06F 17/3053; G06F 17/30849; G06F 3/0481

See application file for complete search history.

(56) References Cited

U.S. PATENT DOCUMENTS

| | | |
|---|---|---|
| 2011/0072492 A1 | 3/2011 | Mohler et al. |
| 2012/0143694 A1 | 6/2012 | Zargahi et al. |
| 2017/0111761 A1 | 4/2017 | Tarlton |

OTHER PUBLICATIONS

"Using—and clearing—jump lists in Windows 10", retrieved from <<https://compusavvy.wordpress.com/2016/04/04/using-and-clearing-jump-lists-in-windows-10/>>, Dated Apr. 4, 2016, 4 Pages.
"Corrected Notice of Allowance Issued in U.S. Appl. No. 15/975,471", dated Oct. 15, 2018, 4 Pages.
"Notice of Allowance Issued in U.S. Appl. No. 15/975,471", dated Oct. 3, 2018, 16 Pages.

CONTEXTUAL STATE-BASED USER INTERFACE FORMAT ADAPTATION

BACKGROUND

User interface formatting has typically been static—with the format of displayed user interface controls remaining the same, without regard to current context that is particular to a user profile to which the user interface controls will be displayed, or other current context in the computer system. As used herein, user interface controls refer to interactive elements displayed in user interface areas, where the interaction occurs in response to user input. A few examples of user interface controls include displayed buttons, check boxes, selectable menu items, scroll bars, and sliders. Some adaptation of user interface formatting has been made dependant on historical context, such as adapting menu items based on the frequency with which items have been used, or which items have been used most recently. Even such historical context has typically been limited to context within a computer application for which a user interface area is being displayed, and typically has not been particular to the user profile to which the user interface area is being displayed.

SUMMARY

Efficiency and/or usability of a computer system can be improved by adapting formatting of user interface controls of user interface areas to fit current contextual state of the computer system, even where such state is from outside the application for which the user interface area is to be displayed. This current contextual state may include contextual state that is particular to a user profile to which the user interface area is to be displayed.

In one example, the tools and techniques can include receiving a request to display the user interface area on a computer display for a displaying computer application in the computer system. In response to the receiving of the request to display, a user interface control format of one or more user interface controls of the user interface area can be adapted to fit a current contextual user interface activity state in the computer system. The adapting of the user interface control format can produce a user interface adaptation instruction that indicates the adapted user interface control format of the user interface area. The adapting of the user interface control format can use data representing the current contextual user interface activity state in the computer system. Also, the current contextual user interface activity state can be a state other than a state of the displaying computer application. The technique can further include using the user interface adaptation instruction in generating the user interface area with the adapted user interface control format indicated in the user interface adaptation instruction. A presentation of the user interface area can be controlled, so that the computer system presents the user interface area with the adapted user interface control format on the computer display for the displaying computer application in the computer system.

In another example of the tools and techniques, a request to adapt a user interface area on a computer display in a computer application in a computer system to a current contextual user interface activity state can be received. In response to receiving the request to adapt, a user interface control format of the user interface area can be adapted to fit a current contextual user interface activity state in the computer system. The adapting can include selecting a subset of user interface controls out of a set of available user interface controls for inclusion in the user interface area. The set of available user interface controls can include additional user interface controls that are not included in the subset of user interface controls. The selecting of the subset of user interface controls can use data representing a current contextual user interface activity state in the computer system, with the current contextual user interface activity state being a state other than a state of the computer application. A user interface adaptation instruction can be sent to the computer application. The adaptation instruction can include one or more instructions to include the subset of user interface controls in the user interface area to be displayed on a computer display in the computer system.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
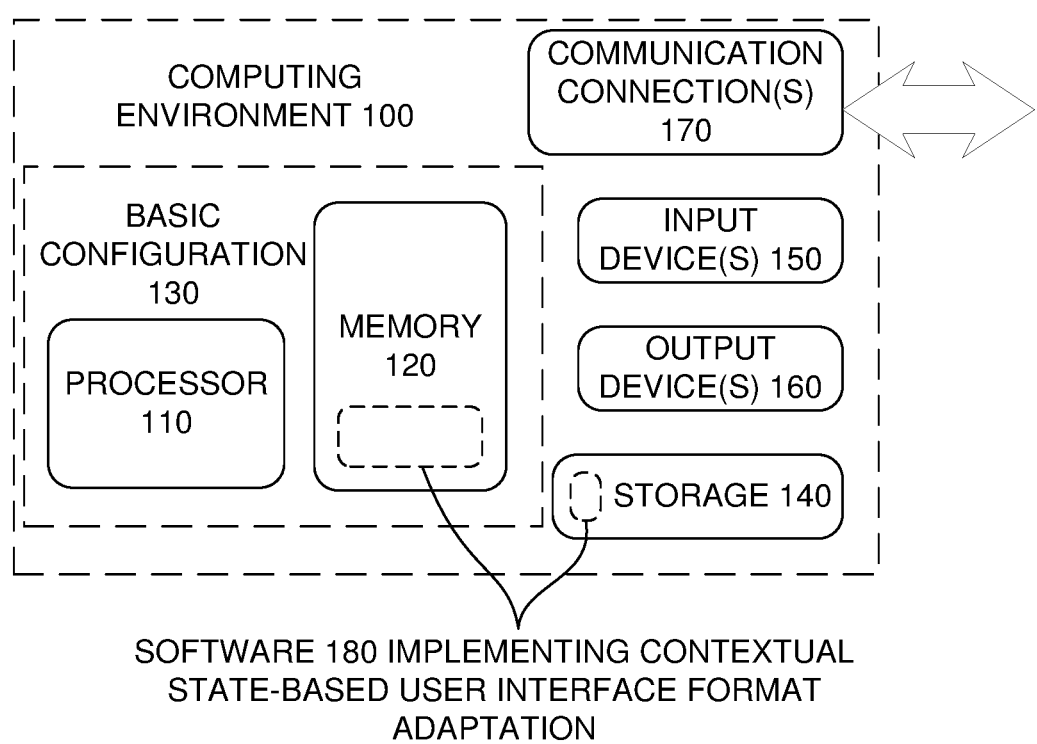
FIG. 1 is a block diagram of a suitable computing environment in which one or more of the described tools and techniques may be implemented.

Aspects described herein are directed to techniques and tools for improvements in adaptive user interface areas in computer systems. Such improvements may result from the use of various techniques and tools separately or in combination.

Such techniques and tools may include using contextual signals or data about a current context to adapt formatting of a user interface area, such as presenting different sets of user interface controls such as action buttons in a presented user interface to fit different contexts in the computer system. This contextual adaptation of user interface formatting may be done for user interface areas from different applications, or for other presented user interface areas. For example, contextual adaptation of user interface formatting may be done for emails, where an incoming email or even an email being drafted could display different action buttons, depending on the current context as indicated in the contextual data (such as a prominent Save Draft button that is present with some contexts but not others, or a snooze button that is present in some contexts but not others, depending on how likely those buttons are to be used, as indicated by current contextual data and informed by historical data). As another example, a display for calling on a smartphone may include one action button to call without using speakerphone and another button to call with speakerphone. However, if the user is driving as indicated by the contextual data, this may only give one call button, and this button can always call on speakerphone. Again, this may utilize a central service like a digital assistant, which can utilize many different types of contextual data. For example, there can be a user interface adaptation engine as part of the digital assistant's plugins.

The contextual adaptation of user interface formatting can be utilized in a system where first party and third party applications can integrate with a user interface adaptation service or platform. For example, applications can provide the service with indications of many different potential user interface controls for a user interface area. The service can decide which controls to show when displaying the user interface area to a user profile, based on the user profile's current context and on learned behavior. The contextual adaptation of user interface formatting may be used in many other scenarios as well. In some scenarios, the adaptation can be particular to a user profile to which the user interface area is to be displayed. For example, current contextual data that is analyzed in the adaptation and/or an adaptation model that is used to analyze the current contextual data can be particular to a user profile to which the user interface area is to be displayed. For example, the current contextual data that is analyzed in the computer system can be particular to the user profile's interaction with one computing device in a computer system, even if the user interface area is to be displayed in a different computing device in the computer system.

The contextual adaptation of user interface formatting can make the computer system easier to use by presenting user interface controls in a format that is appropriate for a current context, even if at least part of that current context is outside the application for which the user interface area is to be displayed, and even if at least part of the current context is in a different computing device from one in which the user interface area will be displayed. This can yield user interface areas that include user interface controls a user is more likely to utilize in the context. Besides increasing the usability of the computer system, contextual adaptation of user interface formatting can make a computer system more efficient. For example, by omitting user interface controls that are unlikely to be used in a particular context and including and/or highlighting other controls that are more likely to be used, as indicated by analyzing data representing current context in the computer system, the computer system can make more efficient use of available area in the user interface display. This can be particularly important for devices with small displays, such as smartphones, but it can also be beneficial for devices with larger displays. Also, required processor, memory, and power usage can be decreased by including contextually-formatted user interface controls, which can decrease the rate of errors from incorrect user input due to having many displayed user interface controls, where some such controls are unlikely to be used in a current context. Also, having appropriate user interface controls for a current context can allow desired actions to be taken with fewer user inputs and associated processing activities in the computer system. For example, in one current context, it may be likely that a user will select a particular user interface control, as indicated by historical click data. However, without contextual adaptation of user interface formatting, the user may need to select a series of other user interface controls before that desired user interface control is displayed. In contrast, with contextual adaptation of user interface formatting, if analysis of the current contextual data indicates that a desired user interface control is likely to be selected, then the initial user interface area can be adapted so the desired user interface control is displayed initially, without requiring the user input selecting the series of controls to reach a user interface area where the desired control is displayed. Of course, other improvements to computer systems may also be produced by the contextual adaptation of user interface formatting, as discussed herein.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

As used herein, a user profile is a set of data that represents an entity such as a user, a group of users, a computing resource, etc. When references are made herein to a user profile performing actions (sending, receiving, etc.), those actions are considered to be performed by a user profile if they are performed by computer components in an environment where the user profile is active (such as where the user profile is logged into an environment and that environment controls the performance of the actions). Often such actions by or for a user profile are also performed by or for a user corresponding to the user profile. For example, this may be the case where a user profile is logged in and active in a computer application and/or a computing device that is performing actions for the user profile on behalf of a corresponding user. To provide some specific examples, this usage of terminology related to user profiles applies with references to a user profile providing user input, receiving responses, or otherwise interacting with computer components discussed herein.

In implementing the tools and techniques discussed herein, privacy of users' information should be respected. For example, users should be given clear opportunities to opt into or out of particular uses of data, especially sensitive personally identifying data. Also, reasonable steps should be taken to keep such data secure, such as encrypting data at rest and/or in transit, limiting physical access to computing devices such as those in data centers, and similar security measures.

I. Exemplary Computing Environment

FIG. 1 illustrates a generalized example of a suitable computing environment (100) in which one or more of the described aspects may be implemented. For example, one or more such computing environments can be used as a user interface adaption service, an application service, and/or a user interface device. Generally, various computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing contextual state-based user interface formatting adaptation. An implementation of contextual state-based user interface formatting adaptation may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "adapt," "generate," "present," "perform," "send," and "receive" to describe computer operations in a computing environment. These and other similar terms are high-level descriptions for operations performed by a computer and should not be confused with acts performed by a human being, unless performance of an act by a human being (such as a "user") is explicitly noted. The actual computer operations corresponding to these terms vary depending on the implementation.

II. User Interface Adaptation System

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. Components of Contextual User Interface Adaptation System

Figure 2:
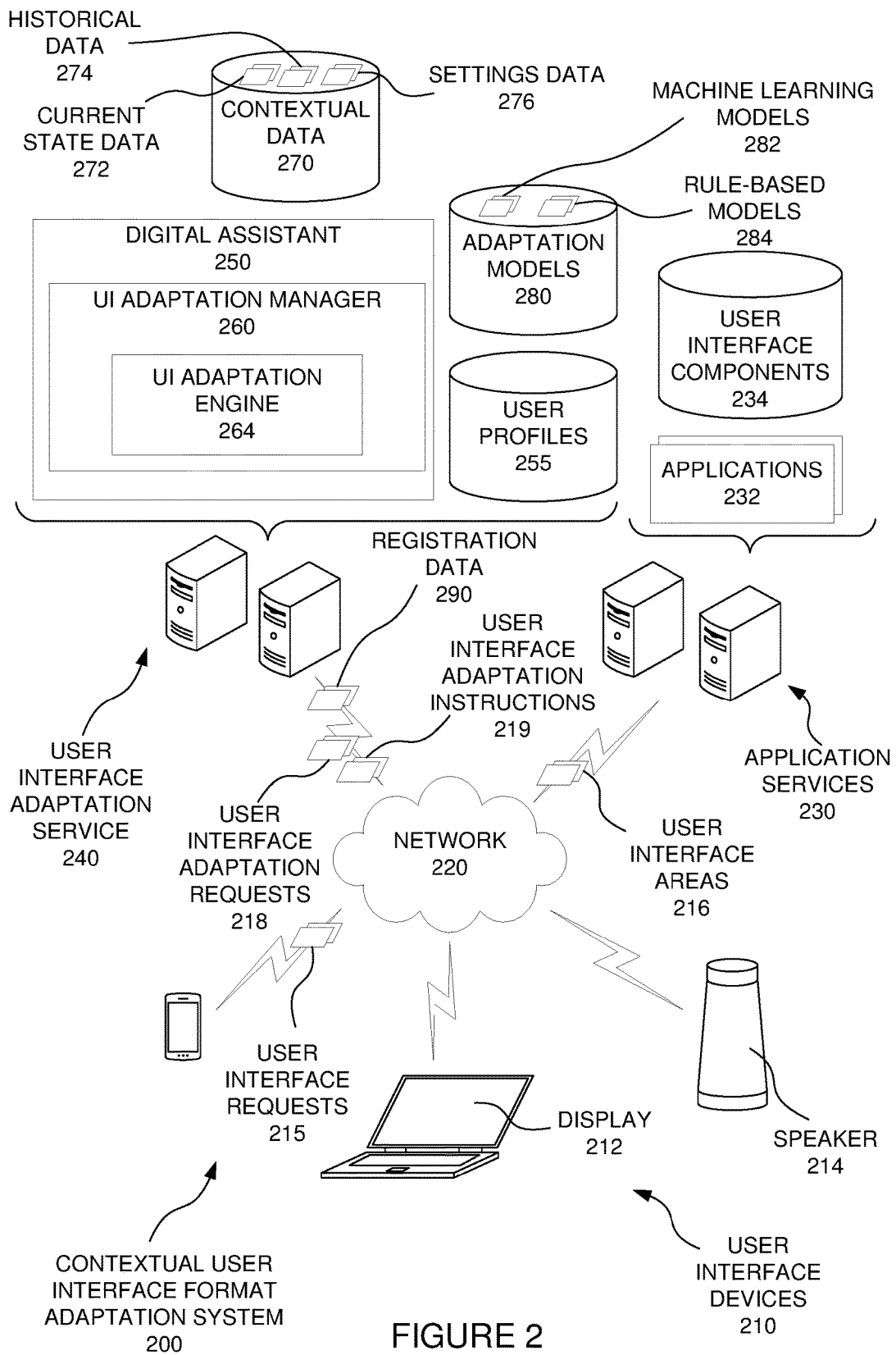
FIG. 2 is a schematic diagram of a computerized contextual user interface format adaptation system.

Referring now to FIG. 2, components of a computerized contextual user interface format adaptation system (200) will be discussed. Each of the components includes hardware and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Referring still to FIG. 2, the system (200) can include user interface devices (210), which can be client devices in the system (200), such as smartphones, desktop computers, laptop computers, tablets, intelligent speaker devices, and/or other user interface devices (210) that each can include one or more subsidiary user interface devices, such as displays (212), speakers (214), microphones, touch sensors, and/or motion-sensing cameras.

The user interface devices (210) can communicate with other computing devices by sending and receiving computer-readable data through a computer network (220) to receive user interface areas (216), which can be provided in response to user interface requests (215) that request displays of user interface areas (216), which requests (215) can prompt the system to produce user interface adaptation requests (218), which can in turn prompt the system to produce user interface adaptation instructions (219), defining adaptations to the requested user interface areas (216), as is discussed in more detail below. The computer network (220) can include one or more different types of networks, such as a local area network, a global network or cloud network such as the Internet, and/or other networks. In the illustrated example, the user interface devices (210) may communicate with one or more application services (230), which can provide applications (232). The applications (232) may be running on the application services (230) remote from the user interface devices (210) as illustrated in FIG. 2 and/or in the user interface devices (210). For example, an application (232) may include a component running in an application service (230) and another component running in a user interface device (210), with the two components communicating with each other through the computer network (220).

The system (200) can also include a user interface adaptation service (240), which can host a digital assistant (250), which can provide digital assistant services to user profiles (255) on the user interface devices (210). The user profiles (255) may be managed by the digital assistant (250) and/or by some other computer component. As used herein, a digital assistant is a computer component that can receive natural language instructions and respond with natural language scripts in a dialog using a user interface device (210). The digital assistant (250) may provide many different features or services to the user interface devices (210). For example, the digital assistant (250) can include a user interface adaptation manager (260), which can manage the adaptation of user interface areas that are adapted to be displayed for the applications (232) on the user interface devices (210). This may include managing applications (232) running as components of the digital assistant (250) (e.g., plugins or skills running as part of the digital assistant (250)) and/or running outside the digital assistant (250). Whether running inside and/or outside the digital assistant (250), the contextual user interface format adaptation service (240) can adapt user interface areas for the applications (232). The applications (232) can access and provide user interface components (234), which are computer-readable instructions that define user interface areas, such as defining formats of user interface controls in the user interface areas. For example, the user interface components (234) can include hierarchical computer-readable code that defines user interface components at multiple levels, such as defining each of multiple user interface controls, defining layouts that dictate spatial relationships between the controls, as well as between the controls and non-interactive visual features in the user interfaces being defined by the user interface components. Accordingly, the user interface components can define different visual features, including which sub-components are included within higher level components, and visual features such as spacing between sub-components, sizes of components, line weights, font characteristics such as font types, font sizes, and other visual features, as well as actions to be taken by the system (200) in response to interaction with user interface controls. Thus, by selecting different user interface components (234) for a user interface area, the user interface area can be adapted for different current runtime contexts.

The applications (232) may provide user interface adaptation requests (218) to the user interface adaptation service. User interface adaptation requests (218) may also be sent to the user interface adaptation service from other components in the system (200). Indeed, some user interface adaptation requests (218) may originate from within the user interface adaptation service (240), such as where the service (240) includes a notification providing service, and the notifications are to be presented in the form of contextually-adaptable user interface areas (216). As with the applications (232), the digital assistant (250) can include a component running in the user interface adaptation service (240) remotely from the user interface devices (210). Also, the user interface adaptation manager (260) can run independent of a digital assistant (250), may run outside the digital assistant (250), and may or may not exchange data with the digital assistant (250).

The user interface adaptation manager (260) can receive registration data (290) for contextually-adaptable user interface areas (216). For example, registration data (290) may indicate an application (232) for which contextually-adapted user interface areas (216) are to be provided, and a user profile (255) to which the user interface areas (216) are to be provided. Thus, the user interface adaptation manager (260) may receive registration data (290) from user profiles (255) through user interface devices (210), indicating that the user profiles (255) have opted into contextual user interface adaptation through user input. The user interface adaptation manager (260) can also receive registration data (290) from applications (232), indicating that the applications (232) have opted into having their user interface areas (216) processed using contextual user interface adaptation. An application (232) may opt in for all its user interface areas (216), or for only some of its user interface areas (216). For example, an application (232) may indicate to the user interface adaptation service (240) whether an individual user interface area is subject to contextual user interface adaptation. If a user interface area (216) is not subject to the contextual user interface adaptation, the user interface area (216) can be presented without regard to current contextual state as indicated in the contextual data (270). Also, opt-out techniques may be used in addition to, or instead of, opt-in techniques. The user interface adaptation manager (260) can expose data communication interfaces for sending and receiving user interface adaptation-related data between the user interface adaptation manager (260) and the applications (232). For example, the user interface adaptation manager (260) may expose application programming interfaces through which application programming interface calls can be made between the user interface adaptation manager (260) and the applications (232).

The user interface adaptation requests (218) can include data packages related to the requests. For example, such data packages can be sent by the applications (232) with the user interface adaptation requests (218). Those data packages can be used by the user interface adaptation manager (260) to adapt the requested user interface areas, such as by selecting user interface components (234) for the associated user interface areas (216). For example, the data in a request (218) for a user interface area (216) may indicate a category for the user interface area. For example, a category could indicate a type of notification if the user interface area (216) is a notification. As an example, for a shopping application, categories could include notifications about product discounts, notifications about order status, notifications about payments, and/or other categories. As another example, data in a request (218) for a user interface area (216) may indicate that a particular user interface component is to be selected for inclusion in a user interface area or is not to be selected for inclusion in the user interface area while current state data indicates a current driving mode (where the current state data indicates a user associated with a user profile (255) is driving an automobile).

The user interface adaptation manager (260) can include a user interface adaptation engine (264), which can use contextual data (270) to adapt the user interface areas (216), such as by selecting user interface components (234) to be applied to corresponding user interface areas (216).

The user interface adaptation manager (260) can retrieve the contextual data (270) in one or more different ways. For example, the user interface adaptation manager (260) may include components on user interface devices (210), which can gather the contextual data (270) and send it to the component of the user interface adaptation manager (260) running in the user interface adaptation service (240). The user interface adaptation manager (260) may receive some of the contextual data (270) from other applications that have collected the data, such as from the applications (232) and/or the digital assistant (250). And some of the contextual data may be retrieved in other ways.

The contextual data (270) can include different types of data that can provide contextual information regarding a user interface area (216) to be displayed, thereby informing the selection of user interface components (234) for that user interface area (216) by the user interface adaptation engine (264). For example, the contextual data (270) may include current state data (272), which can encode information about a current state in the computer system (200) relevant to presentation of the current user interface area (216). Such current state data (272) may include data encoding a state from a current time when the user interface adaptation engine (264) is selecting user interface components (234) for a user interface area (216). Also, the current state data (272) may include data encoding a state from the recent past that is close enough in time to indicate a current state. For example, data indicating an individual application is being actively used one second prior to the user interface adaptation being performed, can indicate that the individual application is still being actively used when the user interface adaptation is performed. The contextual data (270) may also include historical data (274), which can encode historical information from previous times. Historical data (274) is data that far enough back in time that the historical data (274) is not being used by the user interface adaptation manager (260) to indicate that a current state at the time that a user interface area format is being adapted is the same as the state indicated in the historical data (274).

The current state data (272) can be data indicating states other than a state of the digital assistant (250), a state of an application (232) for which the user interface area (216) will be presented, or a state of a user interface area (216) whose user interface components are being selected. In addition, the current state data (272) may also include data indicating states of the digital assistant (250) and/or the application (232) for which the user interface area (216) is to be displayed. For example, the current state data (272) may include battery data indicating a current level of charge in the battery of a user interface device (210) upon which the user interface area (216) is to be presented. As another example, the current state data (272) may include local time data indicating a current local time in a specified time zone, such as a local time for the user interface device (210) upon which the user interface area (216) is to be presented. As another example, the current state data (272) may include current browsing state data indicating a current state of browsing data such as Web pages by a user interface device (210) and/or a user profile (255). As yet another example, the current state data (272) may include an indication of which, if any, application (232) is in focus in a user interface device (210) (i.e., currently being presented through an output of a user interface device (210), such as on a speaker or a visual display). As yet another example, the current state data (272) may include an indication of current usage of a mail application or other category of application (232). Also, the current state data (272) can indicate a level of interaction with one or more devices or applications. For example, a level of interaction may be lower if a user interface device (210) is merely outputting audio without recent user input, and higher if a substantial number of user input actions have recently been provided on the user interface device (210), e.g., to browse through different audio tracks in a music playing application (232). For example, such a level of interaction may be quantified as the number of user input actions in a period of time (such as user input actions directed at a display (212) and/or user input actions in the form of natural language voice commands to a digital assistant (250)). As another example, current state data (272) may indicate that a slide presentation application is currently active and in a presentation mode for the pertinent user profile (255) on a user interface device (210).

The user interface adaptation manager (260) can also use historical data (274). Historical data (274) can include the same types of data examples given above for the current state data (272), over a particular time period. The historical data (274) may also include data indicating user input provided in response to individual user interface areas (216) that were previously presented. Accordingly, the historical data (274) may include data indicating the contextual data at the time of or immediately preceding the presentation of a user interface area (216), including which user interface components were included in the user interface area, along with an indication of the user input response to that user interface area (216). For example, the user input response may be to ignore the user interface area (216), to select and then dismiss the user interface area (216), to select the user interface area (216) and then take some action, such as selecting a user interface control in the user interface area (216), possibly followed by selecting other user interface controls in subsequently displayed user interface areas (such as where user input makes a series of selections of user interface controls following and/or preceding selection of a user interface control on the subject user interface area). Such historical data (274) may include historical data regarding user interface areas (216) presented to the same user profile (255) to which the current user interface area (216) will be presented. The historical data may also include historical data regarding user interface areas presented to user profiles (255) other than the user profile (255) to which the current user interface area (216) will be presented.

The contextual data (270) can also include settings data (276). The settings data (276) may include data indicating settings for a user profile (255) to which the user interface area (216) is to be presented. The settings data (276) may also include data indicating settings for the user interface area (216) itself, such as a priority for the user interface area (216) and a category of the user interface area (216) and/or the application (232) for which the user interface area (216) is to be presented. For example, an application (232) may be categorized as an entertainment application, a productivity application, a shopping application, or some other category of application.

The user interface adaptation engine (264) can use one or more adaptation models (280) to process the contextual data (270) and select one or more user interface components (234) for a corresponding user interface area (216). The adaptation models (280) can include indications of user interface components (234), so that selection of one of the indications in an adaptation model (280) triggers the inclusion of an indication of that user interface component (234) in the user interface adaptation instruction (219). For example, the user interface adaptation engine (264) may use machine learning adaptation models (282) and/or rule-based models (284). The rule-based models can include discrete rules that the user interface adaptation engine (264) applies to the contextual data (270) in selecting user interface components (234). For example, a rule-based model (284) may include filtering rules, so that one or more user interface components (234) is filtered out from use for an individual user interface area (216). For example, a filtering rule may prohibit inclusion of an individual user interface control in user interface areas (216) for applications (232) categorized as entertainment applications during a range of times. If the time is within the range and the user interface area (216) is for an entertainment application, then the user interface adaptation engine (264) can refrain from selecting an indication of that user interface control for inclusion in the user interface adaptation instructions (219). Similarly, a rule may consider a geographic location indicator in the current state data (e.g., a city name, an address, or latitude and longitude coordinates), and may dictate, for example, that a particular user interface component (234) is to be used for this category of user interface areas while that user interface device (210) is at a particular geographical address (as indicated by global positioning system data or other positioning data provided using the user interface device (210)). Such rules can also apply to other data, such as a priority or category of the user interface area (216) in the settings data (276), for example.

A rule-based model (284) may be applied alone, or in combination with a machine learning model (282). For example, the user interface adaptation engine (264) may apply filtering rules in a rule-based model (284) for a user interface area (216), and only apply a machine learning model (282) to select from the remaining non-filtered user interface components (234) using contextual data (270) for the user interface area (216).

The machine learning model (282) may be any of various types of machine learning models, such as decision tree models or artificial neural network models. In one example, the machine learning model (282) can include a deep neural network. Each machine learning model (282) can be trained or tuned using historical data (274), which can be used as training data. For example, the historical data (274) can include historical context-indicating data of the types discussed above for the current state data (272) and the settings data (276), indicating the context of the historical user interface areas (216). The historical data (274) can also include data indicating responses to displayed user interface areas (216) from multiple different user profiles (255).

In an example, a general-purpose machine learning model (282) may be trained with historical data (274) from multiple different user profiles (255) of a digital assistant (250). For example, this training can include operating on the context-indicating data in the historical data (274) to produce results for multiple different user interface areas (216). For example, the context-indicating data can be converted to a vector, which can be processed using the current machine learning model (282). The output of such processing can yield an output vector, which can include a pattern that can be compared to existing recognized patterns. For example, some such output vector patterns may indicate a high likelihood of user engagement with an individual user interface control in a category of user interface area (216), and other output vector patterns may indicate a low likelihood of user engagement with such a user interface control. The results of such pattern matching with the output vector can be compared with the actual user input response to the corresponding user interface area (216), as recorded in the historical data (274). The machine learning model (282) can then be adjusted to account for discrepancies between user interface responses that were predicted by processing using the machine learning model (282) and user interface responses that actually occurred in response to the user interface area (216), as indicated in the historical data (274). As an example, this accounting of discrepancies may use machine learning error correction techniques, such as adjusting parameters of the machine learning model (282) using backpropagation for deep neural network models. Other techniques for training machine learning models (282) may also be used.

Once a general machine learning model (282) has been trained, it can be personalized to individual user profiles (255) by using training techniques such as techniques using backpropagation on the historical data (274) representing user interface areas (216) for a particular user profile (255). Such personalized training can yield a personalized adaptation model (280) for a corresponding user profile (255). Such a personalized adaptation model (280) may include a machine learning model (282) and/or a rule-based model (284) that is personalized to a user profile (255). Personalized adaptation models (280) can be stored in the user interface adaptation service (240), where they can be accessed by the user interface adaptation engine (264) for user interface areas (216) to be presented to corresponding user profiles (255). Prior to having personalized training data for a user profile (255), a general adaptation model (280) can be used.

In using the trained adaptation models (280) in the user interface adaptation service (240) to select user interface components (234) for user interface areas (216), user input can be received at a user interface device (210), indicating that contextual user interface adaptation is to be performed for a corresponding user profile (255). For example, this may include providing user input to select a setting to provide contextual user interface adaptation for one or more applications (232). In response, contextual user interface adaptation registration data (290) can be provided from the user interface device to the corresponding application(s) (232), and to the user interface adaptation manager (260) in the user interface adaptation service (240). For example, this registration data (290) can be stored in the application (232) and/or the user interface adaptation service (240).

The application (232) can send a computer-readable user interface adaptation request (218) to the user interface adaptation service (240), informing the user interface adaptation service (240) that there is a user interface area (216) to be presented. This user interface adaptation request (218) can inform the user interface adaptation service (240) of one or more user profiles (255) to which the user interface area (216) will be presented. Alternatively, the user interface adaptation manager (260) may include a registration list of user profiles (255) to which a certain type of user interface area (216) is to be provided. For example, the user interface adaptation manager (260) may include a list of user profiles (255) for each application (232), so that all user interface areas (216) that are notifications from the application (232) are provided to the user profiles (255) on that list. In that situation, the application (232) may provide the user interface area (216) to the user interface adaptation manager (260), instructing the user interface adaptation manager (260) to send adapted notifications to user profiles (255) registered to receive notifications from that application (232). In either case, data for the user interface area (216) and corresponding user profile (255) can be provided to the user interface adaptation engine (264). Such user interface areas (216) can be adapted separately for different user profiles (255), considering the different contextual data (270) for the different user profiles (255).

Upon receiving a user interface adaptation request (218), the user interface adaptation engine (264) can receive the current state data (272) and the settings data (276) that apply to the user interface adaptation request (218). This current state data (272) and settings data (276) can be operated upon using the adaptation model (280) for that request (218), such as a general or personalized rule-based model (284) and/or a machine learning model (282) for a corresponding user profile (255) to which the corresponding user interface area (216) is to be presented. As an example, the current state data (272) can be retrieved from the user interface adaptation service (240), one or more user interface devices (210), and/or other computer devices in the system (200). The user interface adaptation engine (264) may apply filtering rules from a rule-based model (284) to current state data (272) and settings data (276) for a user interface area (216). If the filtering rules do not apply, then the current state data (272) and possibly settings data (276) can be processed using a machine learning model (282), which can yield a result. For example, the result can indicate a pattern that matches a set of one or more indications of one or more user interface components (234) to be included in the user interface area (216). The indication(s) of the selected user interface component(s) (234) can be included in a user interface adaptation instruction (219) that is responsive to the user interface adaptation request (218).

The user interface adaptation service (240) can send the user interface adaptation instructions (219) to the application (232) for which the user interface area (216) will be presented. The application (232) can use adaptation instructions (219) to identify the user interface components (234) referenced in the user interface adaptation instructions (219). The application (232) can access the referenced user interface components (234) and use those components to generate the user interface area (216), which can include the computer-readable user interface code for presenting the user interface area (216). The application can send the user interface area (216) to a user interface device (210) to be rendered and presented on a display (212), using the user interface code for the user interface area (216) from the application (232).

Alternatively, the user interface adaptation service (240) may generate the user interface area (216) in an embodiment where the user interface adaptation service (240) has access to the user interface components (234). In some embodiments, the user interface adaptation service (240) may be included in an application (232) for which the user interface areas (216) are to be presented, as an integral part of the application or a plugin for the application (232). Also, in any of these embodiments, the components of the contextual user interface format adaptation system (200) may be included on the same computing device and/or distributed over different computing devices remotely from each other. For example, the user interface adaptation service (240) and/or the application service (230) may be included on a single user interface device (210).

After presentation of a user interface area (216), user input responding to the user interface area (216) can be monitored (such as using a component of the user interface adaptation manager (260) on the user interface device (210)), and data representing the responsive user input (or lack thereof) can be provided back to the user interface adaptation service (240). The user interface adaptation service (240) can associate such user input response data with the other contextual data (270) for the individual user interface area (216). Such data can be used to further train or tune the machine learning models (282) using machine learning techniques such as those discussed above. For example, the historical data (274) for such a user interface area (216) can be used to tune a personalized machine learning model (282) for the same user profile (255) to which the user interface area (216) was presented and/or to tune a general machine learning model (282) that can be used for multiple user profiles (255). The resulting updated machine learning models (282) can then be used for selecting user interface components (234) for subsequent user interface areas (216) using the techniques discussed herein.

B. Example Techniques Using Contextual User Interface Format Adaptation System

Figure 3:
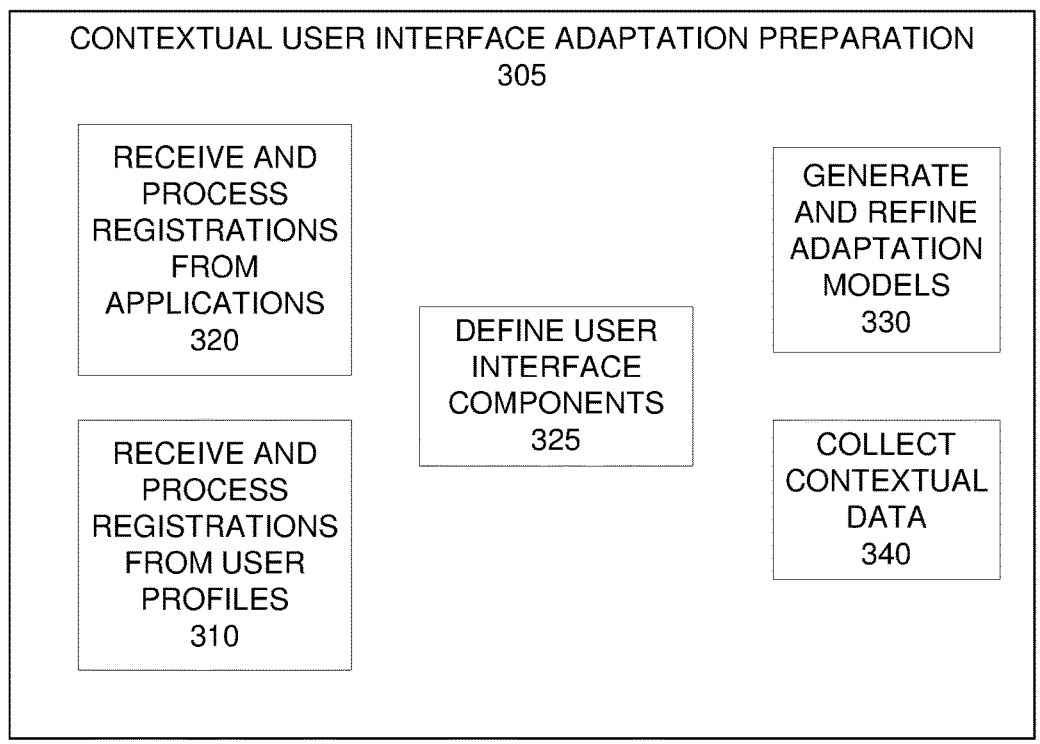
FIG. 3 is a block diagram of contextual user interface adaptation preparation.

Example techniques that may be performed using the system (200) of FIG. 2 will now be discussed with continued reference to FIG. 2 and with reference to FIG. 3 or FIG. 4. Referring to FIG. 3 and still to FIG. 2, techniques for contextual user interface adaptation preparation (305) can prepare the user interface adaptation manager (260) and associated data stores for performing contextual user interface adaptation at runtime. These acts of preparation (305) may be performed prior to runtime processing of user interface adaptation requests (218) using contextual user interface adaptation and may continue during runtime contextual user interface adaptation. Also, the acts of preparation (305) may be performed in parallel and/or in series with each other and with other acts performed by components of the system (200). For example, the preparation (305) can include receiving and processing (320) registration data (290) from applications (232) and receiving and processing (310) registration data (290) from user profiles (255), as discussed above. The preparation (305) can also include defining (325) the user interface components (234). For example, this may be done by receiving and processing user input to select and/or produce the computer-readable instructions for each of the user interface components (234) to be used in the user interface areas (216). This may include manual input and/or automatic generation of such instructions, such as manually inputting or automatically generating computer source code instructions that define user interface components (234), such as layouts, static text, and user interface controls for specified types of the user interface areas (216).

The preparation (305) can also include generating and refining (330) adaptation models (280) to be used in contextual user interface adaptation. For example, this can include defining rule-based models (284) and/or performing machine learning techniques on machine learning models (282). As discussed above, defining the adaptation models (280) can include entering indicators of the user interface components (234) and indicators of types of user interface areas (216) into the adaptation models (280), so that appropriate corresponding adaptation models (280) can be selected and used for corresponding types of user interface areas (216), and so that the adaptation models (280) can refer to the user interface components (234) that are chosen using the adaptation models (280). The preparation (305) can also include collecting (340) contextual data (270) to be used by the user interface adaptation engine (264) in selecting user interface components (234) to be used in the user interface areas (216). While some contextual data (270) (such as historical data (274) and settings data (276)) may be collected prior to runtime processing of user interface areas (216), other contextual data (270) (such as current state data (272)) may be collected at runtime (such as where it is close enough in time to indicate context at the time of processing a user interface adaptation request (218)), as discussed below.

Figure 4:
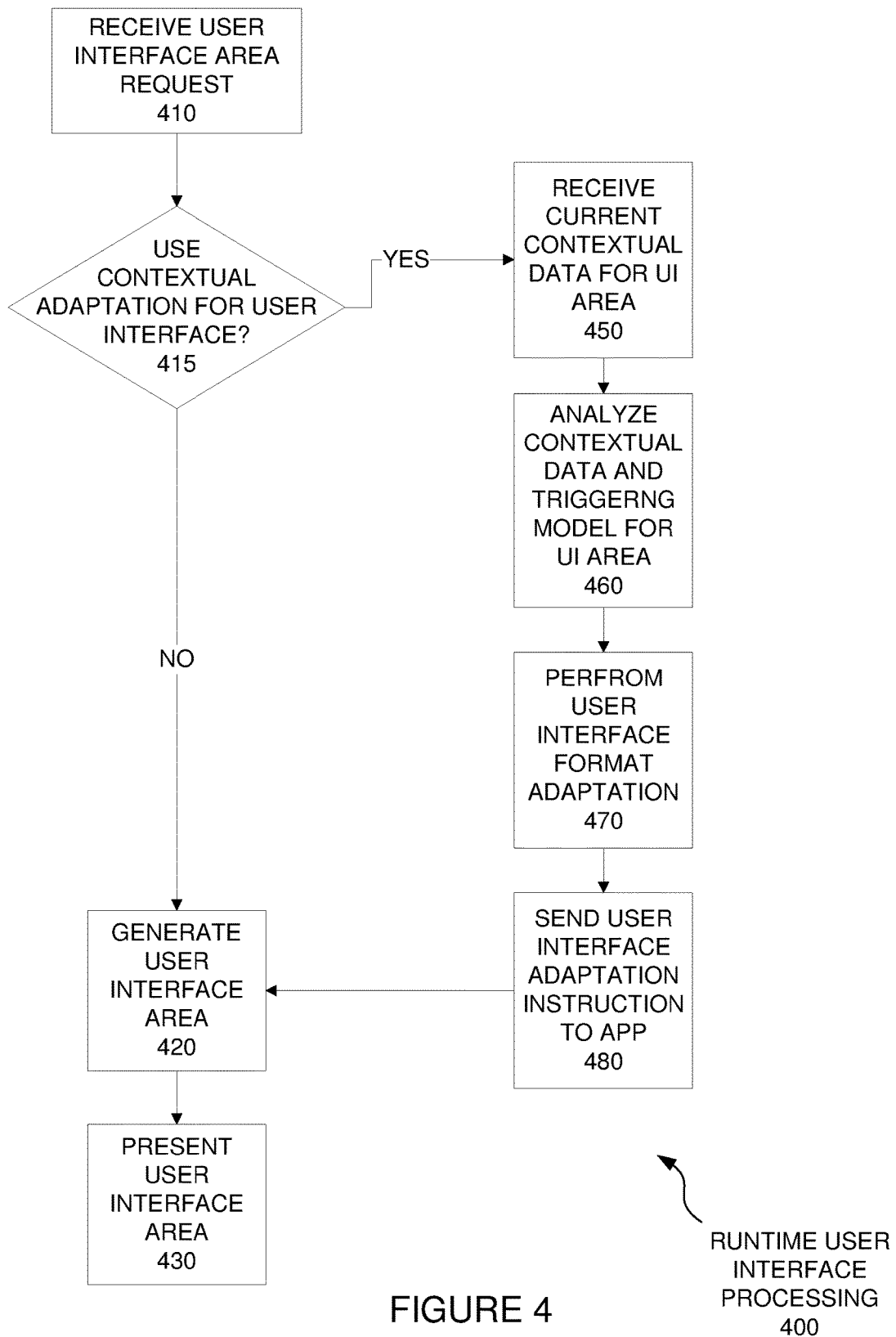
FIG. 4 is a flow chart of runtime user interface processing.

Referring now to FIG. 4 and still to FIG. 2, acts for runtime user interface processing (400) will be discussed. The acts of FIG. 4 are illustrated as an example for processing a single user interface adaptation request (218), for convenience and clarity. However, the system (200) can process multiple different user interface adaptation requests (216) for multiple different applications (232) in series and/or in parallel with each other, and such processing may differ from this specific example. For example, multiple user interface adaptation requests (218) may be processed at the same time using the current state data (272) for a single corresponding user profile (255) and/or for multiple user profiles (255).

The acts of the runtime user interface processing (400) can include receiving (410) a user interface area request, such as from an application (232). The contextual user interface format adaptation system (200) can determine (415) whether contextual user interface adaptation is to be used for the user interface area (216), such as by analyzing opt-in data in the request for the user interface area (216) and/or in the registration data (290). If contextual user interface adaptation is not to be used for the user interface area (216), the user interface area (216) can be generated (420), or selected if it is already generated, which can result in the user interface area (216) being presented (430) on a user interface device (210) for the application (232) without adapting the user interface area (216). For example, the presentation (430) can include sending a command to a user interface display component to present the user interface area (216) and may also include retrieving data for displaying the user interface area (216) from the application (232) and/or from some other component in the system (200).

If the system (200) determines (415) that contextual user interface adaptation is to be used for the user interface area (216), a user interface adaptation request (218) can be produced and sent to the user interface adaptation engine (264) in the user interface adaptation manager (260). The user interface adaptation engine (264) can receive contextual data (270), such as receiving (450) current state data (272) relevant to current contextual circumstances for the user interface area (216). Some contextual data (270) may have been received prior to receiving (410) the user interface adaptation request (216). The user interface adaptation engine (264) can analyze (460) the contextual data (270) and the adaptation model(s) (280) that apply to the individual user interface request (218) and corresponding user interface area (216). Using the results of that analysis, the user interface adaptation engine (264) can perform (470) the user interface format adaptation, which can include determining which user interface components (234) to include in the computer-readable user interface adaptation instruction (219) for the requested user interface area (216).

The user interface adaptation service (240) can send (480) the user interface adaptation instruction (219) to the corresponding application (232). The application (232) can generate the user interface area (420) using the user interface components (234) and can send the generated user interface area (420) to a user interface device (210) to be presented (430) on a display (212). For example, this presenting (430) can include processing the code for the user interface area (216) using a rendering engine and producing signals to be sent to the display itself using the rendering and display components of the user interface device (210) on which the user interface area (216) is to be displayed. Such display can use an application component running on the display device (210), such as a general Web browser and/or a specific client-side portion of the application (232).

As discussed above, alternative techniques may be used for the user interface adaptation techniques discussed herein. For example, the contextual user interface adaptation may be performed using an application on a single device, with the user interface adaptation service included as part of that application. In other embodiments, as illustrated in FIG. 2, a single user interface adaptation service (240) can be used to provide adaptation services for multiple different applications (232), which may be running on multiple different devices, with some running on user interface devices (210) and/or remotely from the user interface devices (210).

C. User Interface Area Examples

Figure 5:
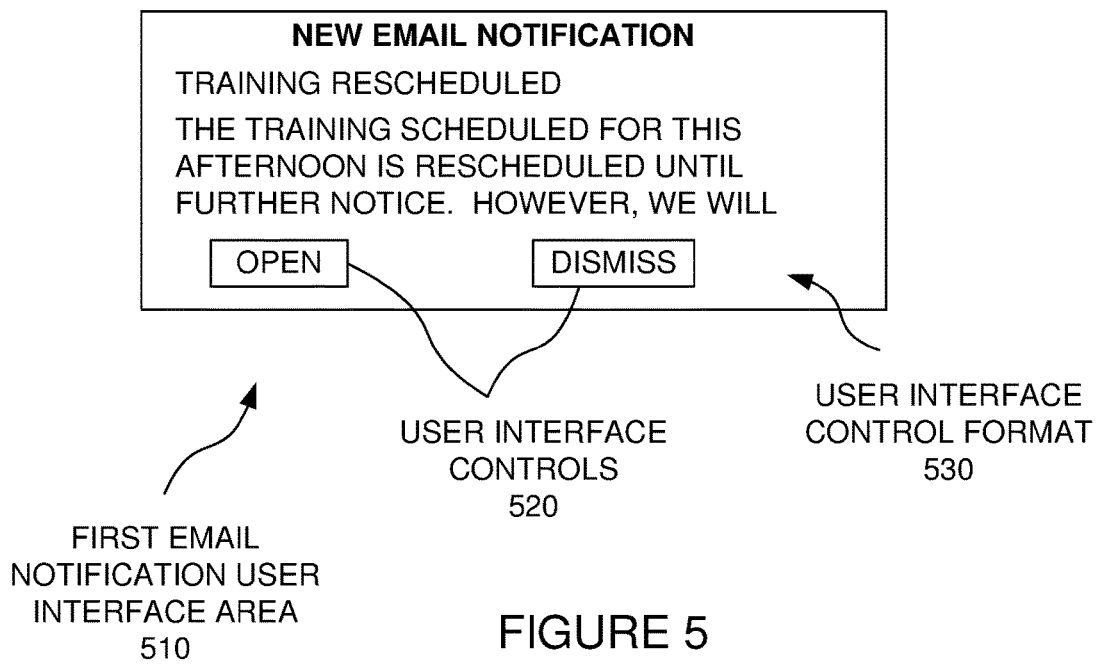
FIG. 5 is an illustration of a first email notification user interface area.

Several examples of different instances of types of user interface areas will be discussed, providing specific examples types of user interface areas being adapted to produce different user interface areas. Referring now to FIG. 5, an example of a first email notification user interface area (510) is illustrated. The first email notification user interface area (510) includes a user interface control format (530) that includes user interface controls (520) in the form of action buttons at the bottom of the user interface area (510). One of the buttons labeled OPEN may be selected by user input to open the referenced email. Another button labeled DISMISS may be selected by user input to dismiss the notification. In an example, this first email notification user interface area (510) may be a default instance format for this type of user interface area.

Figure 6:
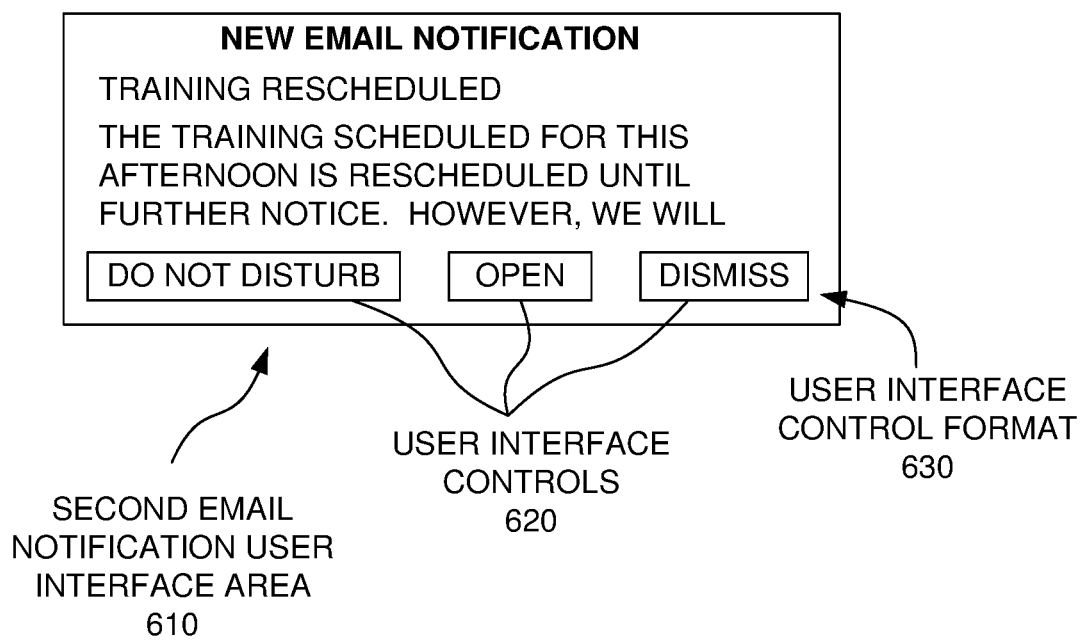
FIG. 6 is an illustration of a second email notification user interface area that is the same type of user interface area as in FIG. 5, but which has a format that is adapted differently from the first email notification user interface area of FIG. 5.

Referring to FIG. 6, a second email notification user interface area (610) is illustrated. This user interface area (610) includes a user interface control format (630), which includes three user interface controls (620) in the form of action buttons at the bottom of the user interface area. These user interface controls (620) include the OPEN and DISMISS buttons discussed above. In addition, the user interface controls (620) include a DO NOT DISTURB button, which can be selected by user input to dismiss the notification and to turn on a do-not-disturb setting, which can prevent display of future notifications. As an example, the second email notification user interface area (610) may be the result of user interface area adaptation when the contextual data (270) indicates that a corresponding user profile (255) is making a presentation, which may be done by a different application than an email application for which the user interface area (610) is being displayed. In this example, the do not disturb setting may remain on as long as a slide presentation application is in a presentation mode.

Figure 7:
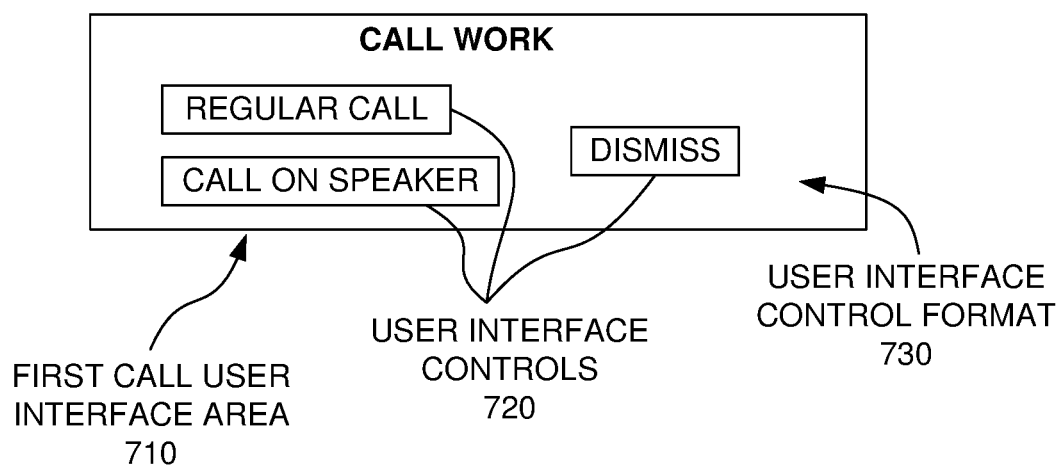
FIG. 7 is an illustration of a first call user interface area.

Referring to FIG. 7, a first call user interface area (710) is illustrated. This user interface area (710) includes a user interface control format (730) that includes user interface controls (720). The user interface controls (720) can include three buttons, a REGULAR CALL button that can be selected to make a regular non-speakerphone telephone call, a CALL ON SPEAKER button that can be selected to make a speakerphone call, and a DISMISS feature that can be selected to dismiss the first call user interface area (710). As an example, this first call user interface area (710) may be a default user interface area.

Figure 8:
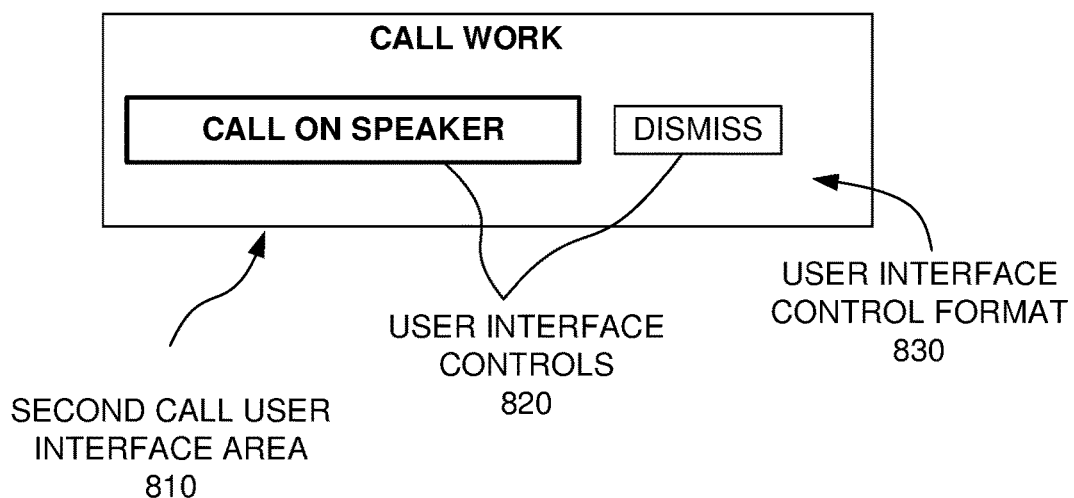
FIG. 8 is an illustration of a second call user interface area that is the same type of user interface area as in FIG. 7, but which has a format that is adapted differently from the first call user interface area of FIG. 7.

Referring to FIG. 8, a second call user interface area (810) is illustrated. For example, the second call user interface area (810) may be an adapted user interface area that is selected when the contextual data (270) indicates that a user is driving. For example, the user interface adaptation engine (264) can make this driving determination using results of analyzing of global positioning system data from a user interface device (210) using an adaptation model (280), or by determining that a smartphone is using close-range communication with a computer system in an automobile. The second call user interface area (810) can include a user interface control format (830), which can include two user interface controls, the CALL ON SPEAKER button and the DISMISS button discussed above. In addition to omitting the REGULAR CALL button, the user interface control format (830) can include adapting the CALL ON SPEAKER button to be larger than in the user interface control format (730). Thus, if the system detects a vehicle driving mode for the user profile (255), the user interface for the call type of user interface illustrated in FIGS. 7-8 can be adapted to the second call user interface area (810). Such a user interface can make it easier for user input to call on a speakerphone, rather than making a regular telephone call while driving.

The examples of FIGS. 5-8 are just examples. There are many other ways to adapt different types of user interface areas using contextual data (270), including current state data (272), as is clear from the remainder of the discussion herein. As one other example, a user interface area for a work-related notification may include details such as a subject line while the displaying device is at a work location but omit details when the device is outside the work location (such as at home or at a restaurant, for example). In the away-from-work location adaptation of the user interface area, the user interface area may include a button that can be selected to show the omitted details, but this button may be omitted in the work location adaptation of the user interface area. Such location information can be determined from global position system data, or data from local computer networks with which a device is communicating.

III. Contextual User Interface Adaptation Techniques

Several user interface adaptation techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. Features discussed in each of the techniques below may be combined with each other in any combination not precluded by the discussion herein, including combining features from a technique discussed with reference to one figure in a technique discussed with reference to a different figure. Also, a computer system may include means for performing each of the acts discussed in the context of these techniques, in different combinations.

Figure 9:
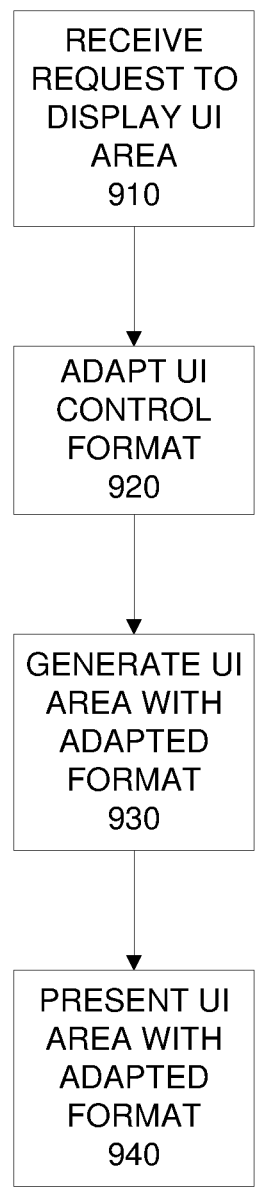
FIG. 9 is a flowchart of a contextual state-based user interface adaptation technique.

Referring to FIG. 9, a contextual user interface adaptation technique will be described. The technique can include receiving (910) a request to display a user interface area on a computer display for a displaying computer application in a computer system. In response to the receiving of the request to display, the technique can include adapting (920) a user interface control format of one or more user interface controls of the user interface area to fit a current contextual user interface activity state in the computer system. The adapting (920) of the user interface control format can produce a user interface adaptation instruction that indicates the adapted user interface control format of the user interface area. The adapting (920) of the user interface control format can use data representing the current contextual user interface activity state in the computer system. Also, the current contextual user interface activity state can be a state other than a state of the displaying computer application, and it may also be a state other than a state of an application in which the user interface area is displayed, a state other than a state of an application that performs the adapting (920), and a state other than a state of an application that carries out actions triggered by selection of the user interface controls of the user interface area. The technique can further include using the user interface adaptation instruction in generating (930) the user interface area with the adapted user interface control format indicated in the user interface adaptation instruction. A presentation of the user interface can be controlled, so that the user interface area is presented (940) with the adapted user interface control format on the computer display for the displaying computer application in the computer system.

The adapting (920) of the user interface control format of the user interface area can include selecting one or more user interface controls for inclusion in the user interface area. For example, the adapting (920) of the user interface control format of the user interface area can include selecting a subset of user interface components out of a set of available user interface components for inclusion in the user interface area. The set of available user interface components can include additional user interface components that are not included in the subset of user interface components. Also, the adaptation instruction can include one or more instructions to include the subset of user interface components in the user interface area.

The adapting (920) of the user interface control format can include processing the data representing the current contextual user interface activity state in the computer system using a user interface adaptation model to select one or more user interface components for inclusion in the user interface area. The model can include a machine leaning model and/or a rule-based model.

The adapting (920) of the user interface control format can include adapting of the user interface control format via a user interface adaptation manager running in the computer system. The current contextual user interface activity state can be a state other than a state of an application in which the adaptation manager runs. The application in which the adaptation manager runs can be a separate application from the displaying application, or the application in which the adaptation manager runs can be the displaying application.

The technique can include adapting user interface areas for a plurality of computer applications using current contextual user interface activity states in the computer system via a user interface manager running in the computer system, with the adapting of the user interface areas comprising the adapting of the user interface control format of the user interface area.

The user interface area can be a user interface area of a notification from the displaying application.

The technique can further include receiving user input selecting a user interface control in the displayed user interface area and responding to the receiving of the user input by performing a requested action via the displaying computer application in the computer system.

Also, the current contextual user interface activity state in the computer system can include contextual user interface activity state in the computer system that is particular to a user profile to which the user interface area is to be presented.

Figure 10:
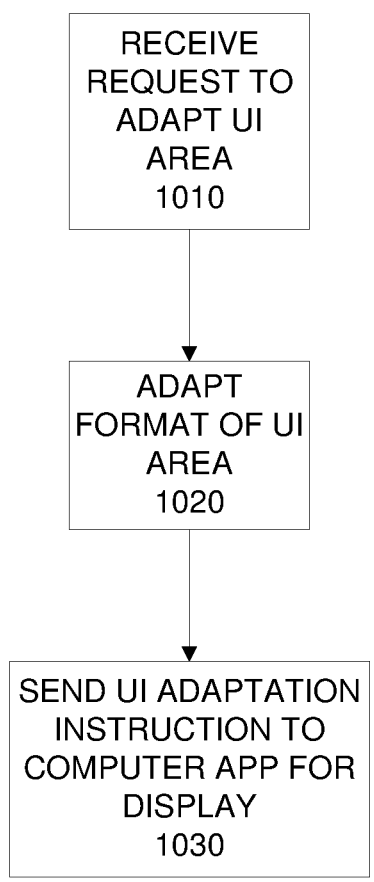
FIG. 10 is a flowchart of another contextual state-based user interface adaptation technique.

Referring to FIG. 10, another contextual user interface adaptation technique will be described. The technique can include receiving (1010) a request to adapt a user interface area on a computer display in a computer application in a computer system to a current contextual user interface activity state. In response to receiving (1010) the request to adapt, the technique can include adapting (1020) a user interface control format of the user interface area to fit a current contextual user interface activity state in the computer system. The adapting (1020) can include selecting a subset of user interface controls out of a set of available user interface controls for inclusion in the user interface area. The set of available user interface controls can include additional user interface controls that are not included in the subset of user interface controls. The selecting of the subset of user interface controls can use data representing a current contextual user interface activity state in the computer system, with the current contextual user interface activity state being a state other than a state of the computer application. The technique of FIG. 10 can also include sending (1030) a user interface adaptation instruction to the computer application. The adaptation instruction can include one or more instructions to include the subset of user interface controls in the user interface area to be displayed on a computer display in the computer system.

The adapting (1020) of the user interface control format can include processing the data representing the current contextual user interface activity state in the computer system using a user interface adaptation model to select one or more user interface components for inclusion in the user interface area, with the user interface adaptation model comprising one or more of a machine learning model and a rule-based model.

The technique can include adapting user interface areas for a plurality of computer applications using current contextual user interface activity states in the computer system via a user interface manager running in the computer system. This adapting of the multiple user interface areas can include the adapting (1020) of the user interface control format of the user interface area discussed above.

Figure 11:
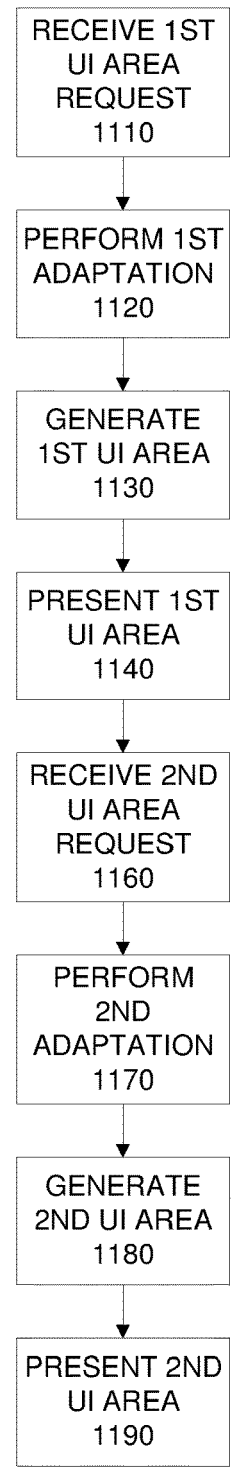
FIG. 11 is a flowchart of yet another contextual state-based user interface adaptation technique.

Referring now to FIG. 11, yet another contextual user interface adaptation technique will be described. The technique can include receiving (1110) a first request to display a first user interface area of a type of user interface area on a computer display for a displaying computer application in a computer system. In response to the receiving (1110) of the first request to display, the technique can include performing (1120) a first adaptation of a user interface control format of one or more user interface controls of the type of user interface area to fit a first current contextual user interface activity state in the computer system. The first adaptation of the user interface control format can produce a first user interface adaptation instruction that indicates the user interface control format of the type of user interface area adapted to fit the first current contextual user interface activity state. The first adaptation of the user interface control format can use data representing the first current contextual user interface activity state in the computer system, with the first current contextual user interface activity state being a state other than a state of the displaying computer application. The technique of FIG. 11 can further include using the first user interface adaptation instruction to generate (1130) the first user interface area of the type of user interface area with the first adaptation of the user interface control format indicated in the first user interface adaptation instruction. A presentation of the generated first user interface area can be controlled so that the generated first user interface area can be presented (1140) on the computer display for the displaying computer application in the computer system. A second request to display a second user interface area on the computer display for the computer application in the computer system can be received (1160). In response to the receiving (1160) of the second request to display, a second adaptation of a user interface control format of one or more user interface controls of the type of user interface area can be performed (1170) to fit a second current contextual user interface activity state in the computer system at a later time than the first current contextual user interface activity state. The second adaptation of the user interface control format can produce a second user interface adaptation instruction that indicates the user interface control format of the type of user interface area adapted to fit the second current contextual user interface activity state. The second adaptation of the user interface control format can use data representing the second current contextual user interface activity state in the computer system, with the second current contextual user interface activity state being a state other than a state of the displaying computer application. The second user interface adaptation instruction can be different from the first user interface adaptation instruction, and the second user interface adaptation instruction can be used to generate (1180) the second user interface area of the type of user interface area with the second adaptation of the user interface control format indicated in the second user interface adaptation instruction. The second adaptation of the user interface control format can be different from the first adaptation of the user interface control format. A presentation of the generated second user interface area can be controlled so that the computer system presents (1190) the generated second user interface area on the computer display for the displaying computer application in the computer system.

In the technique of FIG. 11, differences between the first user interface area and the second user interface area can be dictated by differences between the first current contextual user interface activity state and the second current contextual user interface activity state. The method, computer system, and/or memory may be configured so that the first user interface area and the second user interface area are different, but would be the same if the first current contextual user interface activity state and the second current contextual user interface activity state were the same.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one processor; and
   memory comprising instructions stored thereon that when executed by at least one processor cause at least one processor to perform acts of adapting a user interface area to current contextual user interface activity state, with the acts comprising:
   receiving a request to display the user interface area on a computer display for a displaying computer application in the computer system;
   in response to the receiving of the request to display, adapting a user interface control format of one or more user interface controls of the user interface area to fit a current contextual user interface activity state in the computer system, with the adapting of the user interface control format producing a user interface adaptation instruction that indicates the adapted user interface control format of the user interface area, with the adapting of the user interface control format using data representing the current contextual user interface activity state in the computer system, and with the current contextual user interface activity state being a state other than a state of the displaying computer application, wherein the adapting of the user interface control format of the user interface area comprises selecting one or more user interface controls for inclusion in the user interface area;
   using the user interface adaptation instruction, generating the user interface area with the adapted user interface control format indicated in the user interface adaptation instruction; and
   controlling a presentation of the user interface area with the adapted user interface control format on the computer display for the displaying computer application in the computer system.

2. The computer system of claim 1, wherein the adapting of the user interface control format comprises selecting a subset of user interface controls out of a set of available user interface controls for inclusion in the user interface area, with the set of available user interface controls including additional user interface controls that are not included in the subset of user interface controls, wherein the adaptation instruction comprising one or more instructions to include the subset of user interface controls in the user interface area.

3. The computer system of claim 1, wherein the adapting of the user interface control format comprises processing the data representing the current contextual user interface activity state in the computer system using a user interface adaptation model to select one or more user interface components for inclusion in the user interface area.

4. The computer system of claim 3, wherein the model comprises a machine learning model.

5. The computer system of claim 3, wherein the model comprises a rule-based model.

6. The computer system of claim 1, wherein the adapting of the user interface control format comprises adapting of the user interface control format via a user interface adaptation manager running in the computer system, wherein the current contextual user interface activity state is a state other than a state of an application in which the adaptation manager runs.

7. The computer system of claim 6, wherein the application in which the adaptation manager runs is the displaying computer application.

8. The computer system of claim 6, wherein the application in which the adaptation manager runs is separate from the displaying computer application.

9. The computer system of claim 1, wherein the acts comprise adapting user interface areas for a plurality of computer applications using current contextual user interface activity states in the computer system via a user interface manager running in the computer system, with the adapting of the user interface areas comprising the adapting of the user interface control format of the user interface area.

10. The computer system of claim 1, wherein the user interface area is a user interface area of a notification from the displaying computer application.

11. The computer system of claim 1, wherein the acts further comprise receiving user input selecting a user interface control in the displayed user interface area and responding to the receiving of the user input by performing a requested action via the displaying computer application in the computer system.

12. The computer system of claim 1, wherein the current contextual user interface activity state in the computer system comprises contextual user interface activity state in the computer system that is particular to a user profile to which the user interface area is to be presented.

13. A computer-implemented method, comprising:
receiving a request to adapt a user interface area on a computer display in a computer application in a computer system to a current contextual user interface activity state;
in response to the receiving of the request to adapt, adapting a user interface control format of the user interface area to fit a current contextual user interface activity state in the computer system, with the adapting of the user interface control format comprising selecting a subset of user interface controls out of a set of available user interface controls for inclusion in the user interface area, with the set of available user interface controls including additional user interface controls that are not included in the subset of user interface controls, with the selecting of the subset of user interface controls using data representing a current contextual user interface activity state in the computer system, and with the current contextual user interface activity state being a state other than a state of the computer application; and
sending a user interface adaptation instruction to the computer application, with the adaptation instruction comprising one or more instructions to include the subset of user interface controls in the user interface area to be displayed on a computer display in the computer system.

14. The method of claim 13, wherein the adapting of the user interface control format comprises processing the data representing the current contextual user interface activity state in the computer system using a user interface adaptation model to select one or more user interface components for inclusion in the user interface area, with the user interface adaptation model comprising one or more of a machine learning model and a rule-based model.

15. The method of claim 13, wherein the method comprises adapting user interface areas for a plurality of computer applications using current contextual user interface activity states in the computer system via a user interface manager running in the computer system, with the adapting of the user interface areas comprising the adapting of the user interface control format of the user interface area.

16. The method of claim 13, wherein the method comprises adapting user interface areas for a plurality of computer applications using current contextual user interface activity states in the computer system via a user interface manager running in the computer system, with the adapting of the user interface areas comprising the selecting of the subset of user interface controls.

17. One or more computer-readable memory having computer-executable instructions embodied thereon that, when executed by at least one processor, cause at least one processor to perform acts comprising:
receiving a first request to display a first user interface area of a type of user interface area on a computer display for a displaying computer application in a computer system;
in response to the receiving of the first request to display, performing a first adaptation of a user interface control format of the type of user interface area to fit a first current contextual user interface activity state in the computer system, with the first adaptation of the user interface control format producing a first user interface adaptation instruction that indicates the user interface control format of the type of user interface area adapted to fit the first current contextual user interface activity state, with the first adaptation of the user interface control format using data representing the first current contextual user interface activity state in the computer system, and with the first current contextual user interface activity state being a state other than a state of the displaying computer application, wherein the first adaptation of the user interface control format comprises selecting one or more user interface controls for inclusion in the first user interface area;
using the first user interface adaptation instruction, generating the first user interface area of the type of user interface area with the first adaptation of the user interface control format indicated in the first user interface adaptation instruction; and
controlling a presentation of the generated first user interface area on the computer display for the displaying computer application in the computer system;
receiving a second request to display a second user interface area of the type of user interface area on the computer display for the displaying computer application in the computer system;
in response to the receiving of the second request to display, performing a second adaptation of the user interface control format of the type of user interface area to fit a second current contextual user interface activity state in the computer system at a later time than the first current contextual user interface activity state, with the second adaptation of the user interface control format producing a second user interface adaptation instruction that indicates the user interface control format of the type of user interface area adapted to fit the second current contextual user interface activity state, with the second adaptation of the user interface control format using data representing the second current contextual user interface activity state in the computer system, and with the second current contextual user interface activity state being a state other than a state of the displaying computer application;

using the second user interface adaptation instruction, which is different from the first user interface adaptation instruction, generating the second user interface area of the type of user interface area with the second adaptation of the user interface control format indicated in the second user interface adaptation instruction, with the user interface control format being adapted differently in the second user interface area than in the first user interface area; and controlling a presentation of the generated second user interface area on the computer display for the displaying computer application in the computer system.

18. The one or more computer-readable memory of claim 17, wherein differences between the first user interface area and the second user interface area are dictated by differences between the first current contextual user interface activity state and the second current contextual user interface activity state.

19. The one or more computer-readable memory of claim 17, wherein computer-readable memory is configured so that the first user interface area and the second user interface area have the same user interface control format if the first current contextual user interface activity state and the second current contextual user interface activity state were the same.

20. The one or more computer-readable memory of claim 17, wherein the second adaptation of the user interface control format comprises selecting one or more user interface controls for inclusion in the second user interface area.

* * * * *